United States Patent
Matthews

(10) Patent No.: US 8,821,103 B1
(45) Date of Patent: Sep. 2, 2014

(54) LIFT ATTACHABLE TO A VEHICLE

(76) Inventor: Dan A. Matthews, Raleigh, NC (US)

( * ) Notice: Subject to any disclaimer, the term of this patent is extended or adjusted under 35 U.S.C. 154(b) by 562 days.

(21) Appl. No.: 12/806,486

(22) Filed: Aug. 12, 2010

(51) Int. Cl.
B60P 1/44 (2006.01)

(52) U.S. Cl.
USPC .......................................... 414/558; 414/921

(58) Field of Classification Search
USPC ................................ 414/546, 549, 558, 921
See application file for complete search history.

(56) References Cited

U.S. PATENT DOCUMENTS

| | | | | |
|---|---|---|---|---|
| 2,732,960 | A * | 1/1956 | Nilson | 414/549 |
| 4,058,228 | A * | 11/1977 | Hall | 414/549 |
| 4,134,504 | A | 1/1979 | Salas et al. | |
| 4,299,528 | A | 11/1981 | Kazeil et al. | |
| 4,909,700 | A | 3/1990 | Fontecchio et al. | |
| 4,958,979 | A | 9/1990 | Svensson | |
| 5,224,722 | A * | 7/1993 | Kempf | 280/166 |
| 5,375,962 | A | 12/1994 | Kempf | |
| 5,549,437 | A * | 8/1996 | Kishi | 414/462 |
| 5,556,250 | A | 9/1996 | Fretwell et al. | |
| 6,102,648 | A | 8/2000 | Fretwell et al. | |
| 6,179,546 | B1 | 1/2001 | Citrowske | |
| 6,309,170 | B1 | 10/2001 | Vartanian | |
| 6,379,102 | B1 | 4/2002 | Kameda | |
| 6,398,479 | B1 | 6/2002 | Dupuy et al. | |
| 6,435,804 | B1 | 8/2002 | Hutchins | |
| 6,739,825 | B2 | 5/2004 | Beck et al. | |
| 6,837,670 | B2 * | 1/2005 | Goodrich | 414/546 |
| 7,326,024 | B2 | 2/2008 | Cohn et al. | |
| 2002/0057960 | A1 | 5/2002 | Cohn et al. | |

* cited by examiner

Primary Examiner — Jonathan Snelting
(74) Attorney, Agent, or Firm — Peter Loffler

(57) ABSTRACT

A lifting system for lifting and lower people between a vehicle door and ground level uses a carriage that is slid underneath and out from the undercarriage of the vehicle. A lift platform is flush with the carriage when stowed and is capable of being raised from this position up to the door and lowered down to the ground. A series of housing are located on the underside of the carriage and have a sprocket gear thereon. Extension arms are attached to each gear and rotatably to a lift platform. Rack gears mesh with the sprocket gears for rotating the arms and thus the platform up and down, the rack gears articulated via one or more hydraulic drives, with rotation of the arms resulting in articulation of the platform.

5 Claims, 8 Drawing Sheets

LIFT ATTACHABLE TO A VEHICLE

BACKGROUND OF THE INVENTION

1. Field of the Invention

The present invention relates to a lift attached to an undercarriage of a vehicle, the lift being used to raise and lower a platform between a door of the vehicle and ground level in order to assist mobility limited people in ingress into and egress from the vehicle.

2. Background of the Prior Art

As many American enter their retirement years, they are hitting the road to see this great country. No job, no kids at home, no worries, just pack up and travel wherever the heart and the map (or GPS) dictate. Although many long-term travelers use hotels and motels along the way, an increasing number of travelers prefer to use a recreation vehicle (RV) as their mode of transport as well as lodging. The RV, whether towed or self-locomoted, eliminates the need to pack and unpack regularly, allows the travelers to have a kitchen and dining area for meal preparation and consumption, and basically serves as a home away from home.

While the RV is a great travel tool, many travelers, by being up in their years, have limited mobility, either walking with assistance devices such as canes or walkers, or are confined to a wheelchair or scooter for their locomotion needs. Although such travelers tend to get by with their limitations, ingress into and egress from the RV can be a challenge, especially for wheelchair bound travelers.

To address this concern, devices have been proposed that assist such limited mobility RV users with RV ingress and egress. Such devices provide a mechanical assist to limited mobility travelers and come in one of two broad categories. One type of assist device is installed within the interior of the RV. When use of the device is desired, the device is unfolded, either manually or automatically so that a lift platform is positioned exterior of the RV. The user either walks or rolls onto the platform and the platform is lowered, either via an electric or hydraulic motor. For RV ingress, the lift platform is lowered to ground level, the person steps or rolls onto the lift platform, and the platform is raised by the motor until the platform is at entry level in order to allow the user to walk or roll off of the platform into the RV. The device is then folded up and stowed back within the interior of the RV. While such devices work with varying degrees of efficiency, they tend to be unusually complex in design making such devices very expensive to purchase as well as maintain. Additionally, installation of these interior mounted devices can be quite cumbersome, often requiring extensive modifications to the RV, modifications many owners are very reluctant to make. Additionally, when not in use, such devices occupy a substantial amount of the limited real estate available within the interior of the RV.

The other maintain of assist device is mounted on an exterior of the RV, usually underneath the RV attached to the undercarriage of the RV. When use of the device is needed, the lift platform is moved into position from underneath the RV, either manually or under power from the device. The person steps or rolls onto the lift platform and the lift platform lowers the person to the ground via an electric or hydraulic motor. In order for the person to ingress the RV, the reverse occurs with the person walking or rolling onto the lift platform, and the platform is raised by the motor in order to allow the user to walk or roll off of the platform into the RV. The device is then stowed underneath the RV until it is again needed. The problem with these exterior mounted devices is that they too tend to be complex in design so that they are expensive to manufacture and maintain. Many of these devices also require an undesired extensive modification of the RV. Additionally, these devices tend to have a fairly high profile which can be problematic with many RVs, especially RVs that are towed by a tow vehicle, as many such RVs have a very low ground clearance to begin with. Addition of a high profile lifting apparatus depending downwardly from the undercarriage of a low clearance vehicle can present problems, especially at campgrounds where the road is less than ideally smooth. Furthermore, when these types of devices are retrieved from the undercarriage and placed into the ready position, the lift platform is located at approximately the plane of the undercarriage. As the plane of the floor of the interior of the RV is above the plane of the undercarriage, the lift platform is below the floor level. This requires a small step down from the RV to the lift platform (or a small step up from the lift platform to the RV), which may not be a major problem to a user walking with a cane, but can prove quite problematic to a wheelchair bound user.

What is needed is a system whereby a person can be raised and lowered between the door of an RV and ground level, which system addresses the above noted shortcomings found in the art. Specifically, such a system must be of relatively simple design and construction so that the device is relatively easy and inexpensive to manufacture so as to be readily affordable to a large segment of potential consumers for this type of product. Such a system must be relatively easy to install onto the RV without the need to make extensive modifications to the RV. Such a system must not rob the interior of the RV of any of the limited and valuable real estate within the RV. Ideally, such a system should allow a smooth transition between the RV and the system's lift platform as well as between the lift platform and ground level, so that all users, including wheelchair bound users can use the system with ease and efficiency.

SUMMARY OF THE INVENTION

The lift attachable to a vehicle of the present invention addresses the aforementioned needs in the art by providing a lifting system that is attached to a vehicle, such as a recreational vehicle, wherein the lift raises and lowers an individual between an entrance to the vehicle and the ground. The lift attachable to a vehicle is attached to the undercarriage of the vehicle and requires very little modification to the vehicle, making installation, quick, easy, and low cost. The lift attachable to a vehicle has a very sleek and slender profile so that the vehicle onto which the present invention is attached can be maintained on most road surfaces including the relatively uneven surfaces found at many campsites without major fear of bottoming out. The lift attachable to a vehicle is relatively simple in design and construction and is produced using standard manufacturing techniques. The lift attachable to a vehicle allows a person to use the device without the need to traverse a step between the vehicle and the device so that wheelchair bound individuals can easily utilize the device unassisted.

The lift attachable to a vehicle is comprised of a pair of parallel rails that is attached to an undercarriage of the vehicle in appropriate spaced apart fashion. A carriage is slidably attached to the rails and is capable of sliding between a stowed position underneath the undercarriage and a ready position extending at least partially outwardly from the undercarriage. The carriage can be locked in the stowed position for vehicle travel. A lift platform is pivotally attached to the carriage such that the lift platform is capable of being pivoted between a stored position wherein the lift platform is essentially flush with the carriage which allows the carriage to be capable of being slid into the stowed position, a raised position wherein the lift platform is above the stored position, and a lowered position wherein the lift platform is below the stored position. A drive system is operationally connected to the lift platform and articulates the lift platform between the stored position, the raised position, and the lowered position. The drive system is comprised of a first gear housing that has a first sprocket gear thereon and is attached to the carriage proximate a first side of the lift platform. A second gear housing has a second sprocket gear thereon and is attached to the carriage proximate an opposing second side of the lift platform. A first extension arm has a first end attached to the first sprocket gear and an opposing second end rotatably attached to the first side of the lift platform. A second of extension arm has a third end attached to the second sprocket gear and an opposing fourth end rotatably attached to the second side of the lift platform. A first drive motor has a first ram, the first drive motor being attached to the carriage. A first rack gear is attached to the first ram and is gearably meshed with the first sprocket gear. Movement of the ram causes movement of the first rack gear which causes rotation of the meshed first sprocket gear which causes the first extension arm to rotate. A third gear housing has a third sprocket gear thereon and is attached to the carriage proximate the first side of the lift platform. A fourth gear housing has a fourth sprocket gear thereon and is attached to the carriage proximate the second side of the lift platform. A third of extension arm has a fifth end attached to the third sprocket gear and an opposing sixth end rotatably attached to the first side of the lift platform. A fourth of extension arm has a seventh end attached to the fourth sprocket gear and an opposing eighth end rotatably attached to the second side of the lift platform. A second rack gear is connected to the first rack gear (the second rack gear may be a second portion of the first rack gear) and gearably meshes with the third sprocket gear. A second drive motor has a second ram, the second drive motor being attached to the carriage. A third rack gear is attached to the second ram and gearably meshes with the third sprocket gear. Movement of the second ram causes movement of the third rack gear which causes rotation of the meshed third sprocket gear which causes the third extension arm to pivot. A fourth rack gear is connected to the third rack gear (the fourth rack gear may be a second portion of the third rack gear) and gearably meshes with the fourth sprocket gear. A landing gear is pivotally attached to an underside of the carriage such that the landing gear is pivotable between a retracted position wherein the landing gear is essentially flush against the carriage and an extended position wherein the landing gear depends downwardly from the carriage. The landing gear is telescoping.

BRIEF DESCRIPTION OF THE DRAWINGS

Similar reference numerals refer to similar parts throughout the several views of the drawings.

DESCRIPTION OF THE PREFERRED EMBODIMENT

Figure 1:
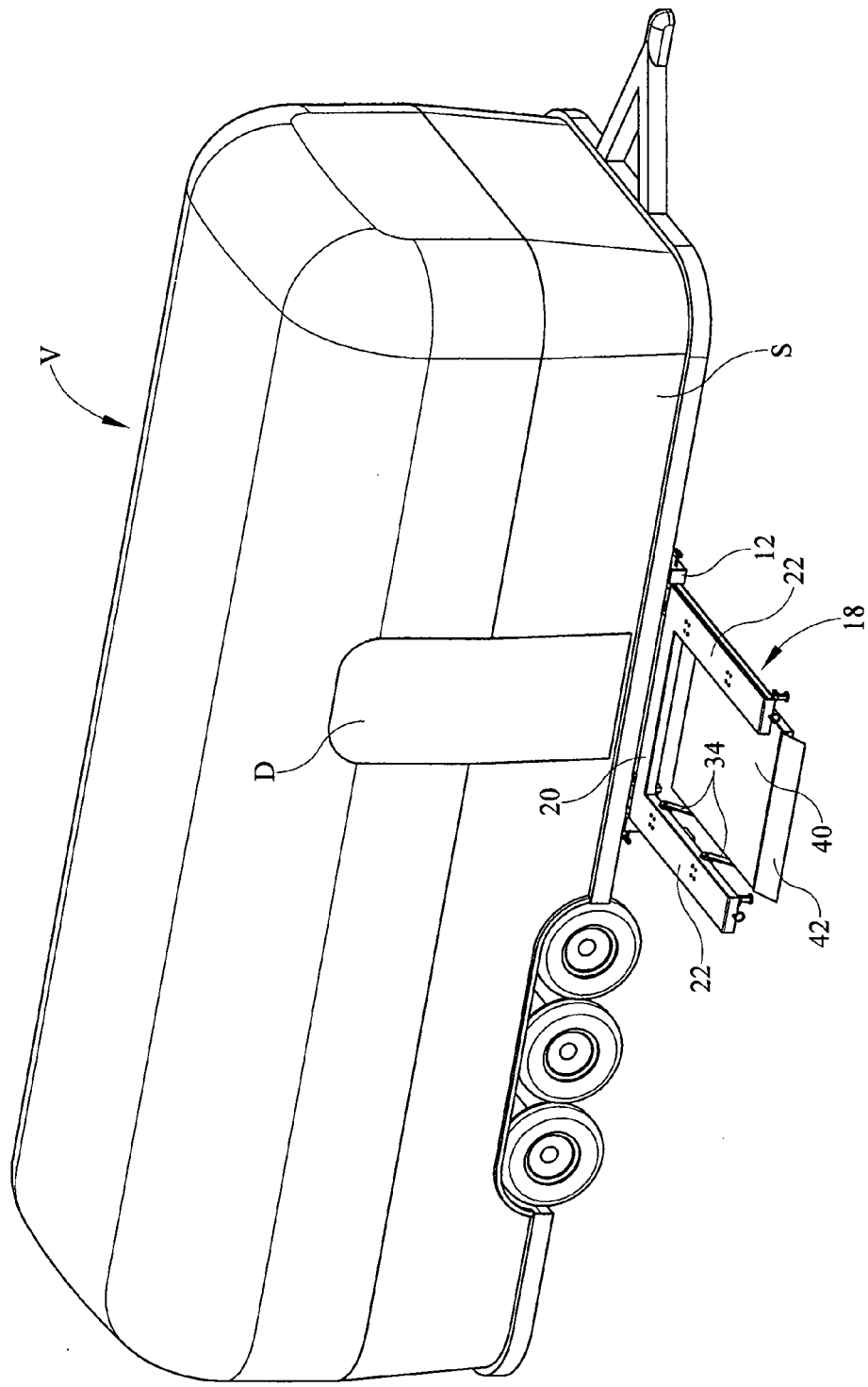
FIG. 1 is an environmental view of the lift attachable to a vehicle of the present invention in a lowered position.
Figure 2:
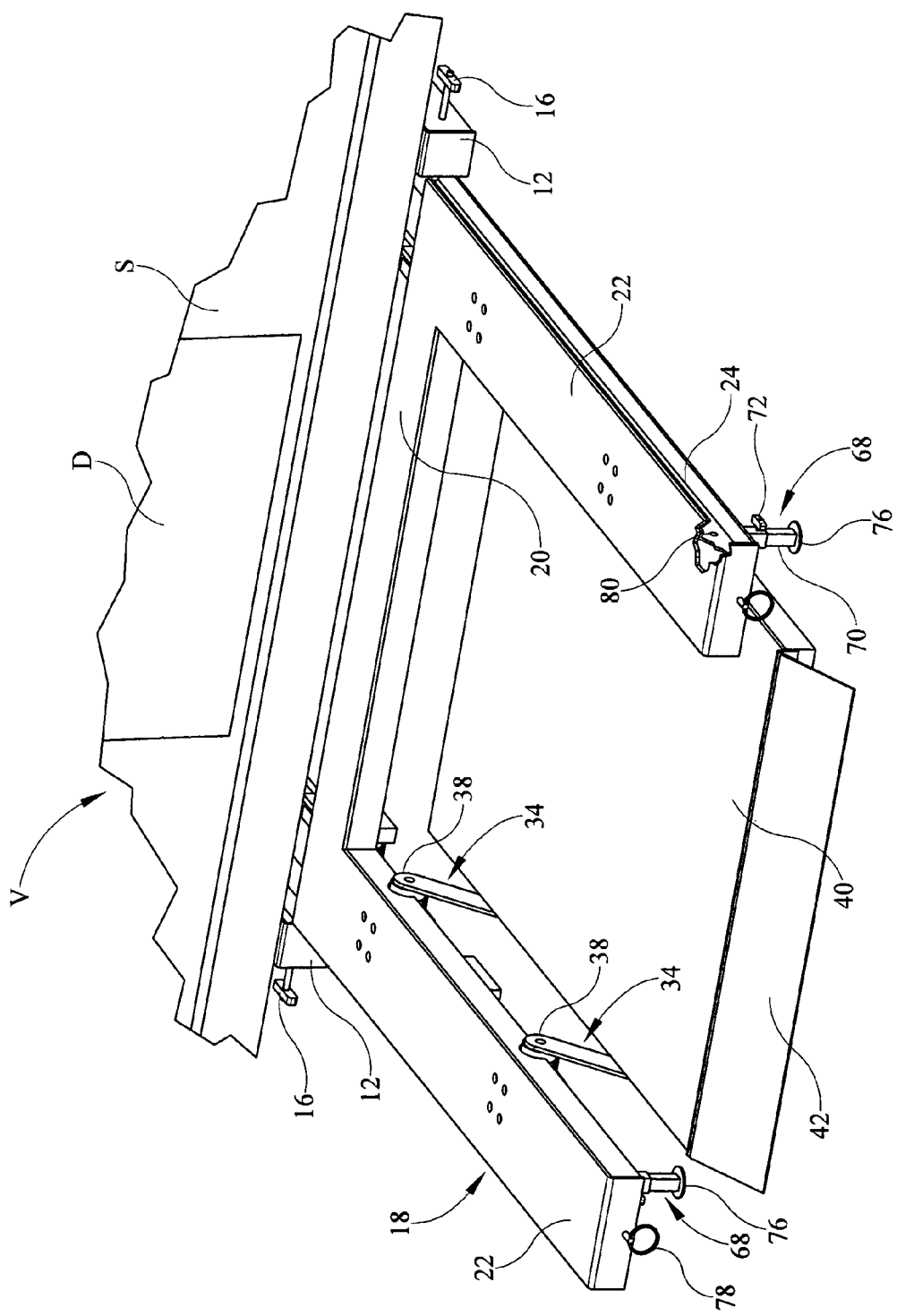
FIG. 2 is a perspective view of the lift attachable to a vehicle.
Figure 3:
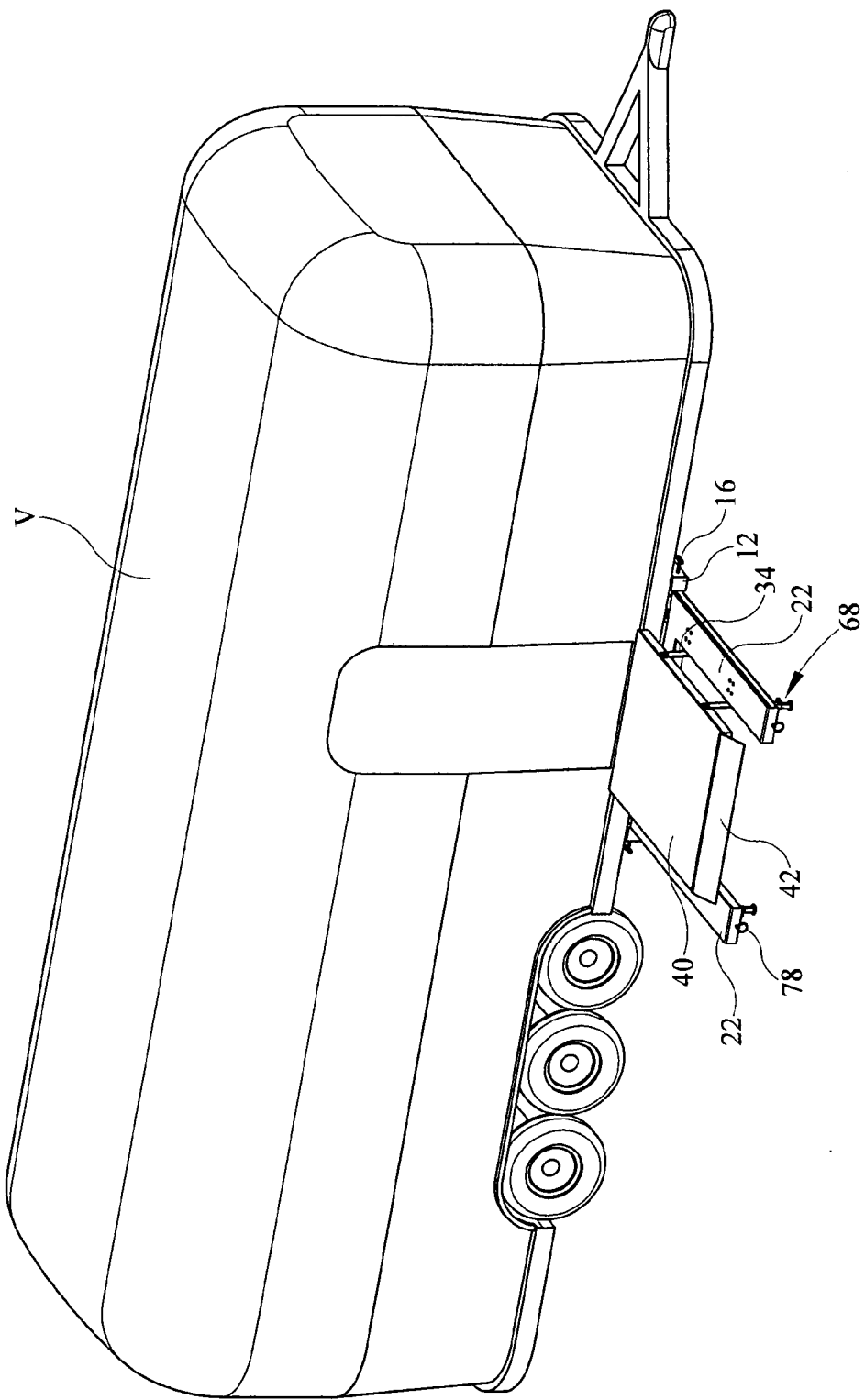
FIG. 3 is an environmental view of the lift attachable to a vehicle in a raised position.
Figure 4:
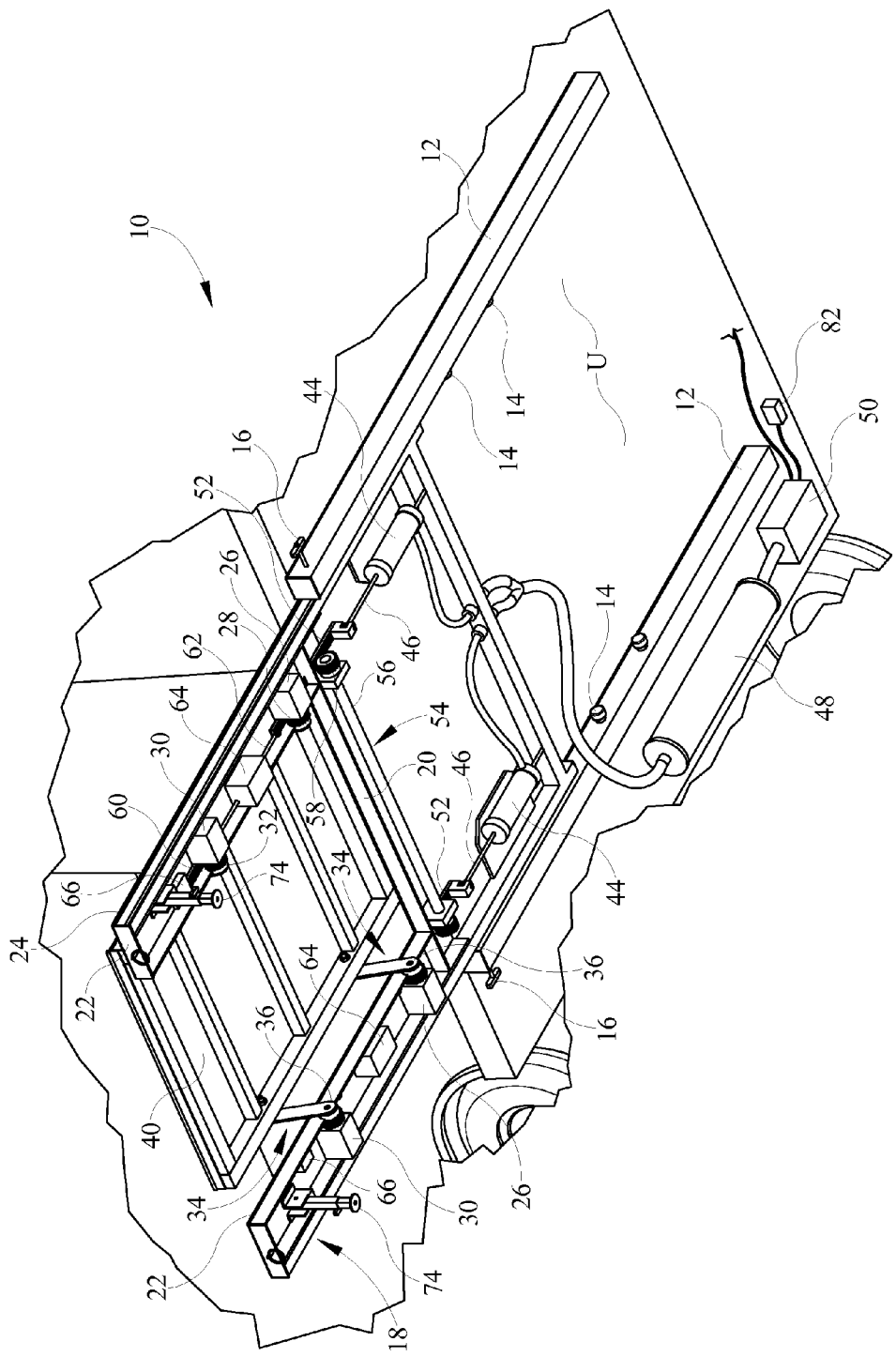
FIG. 4 is an underneath perspective view of the lift attachable to a vehicle.
Figure 5:
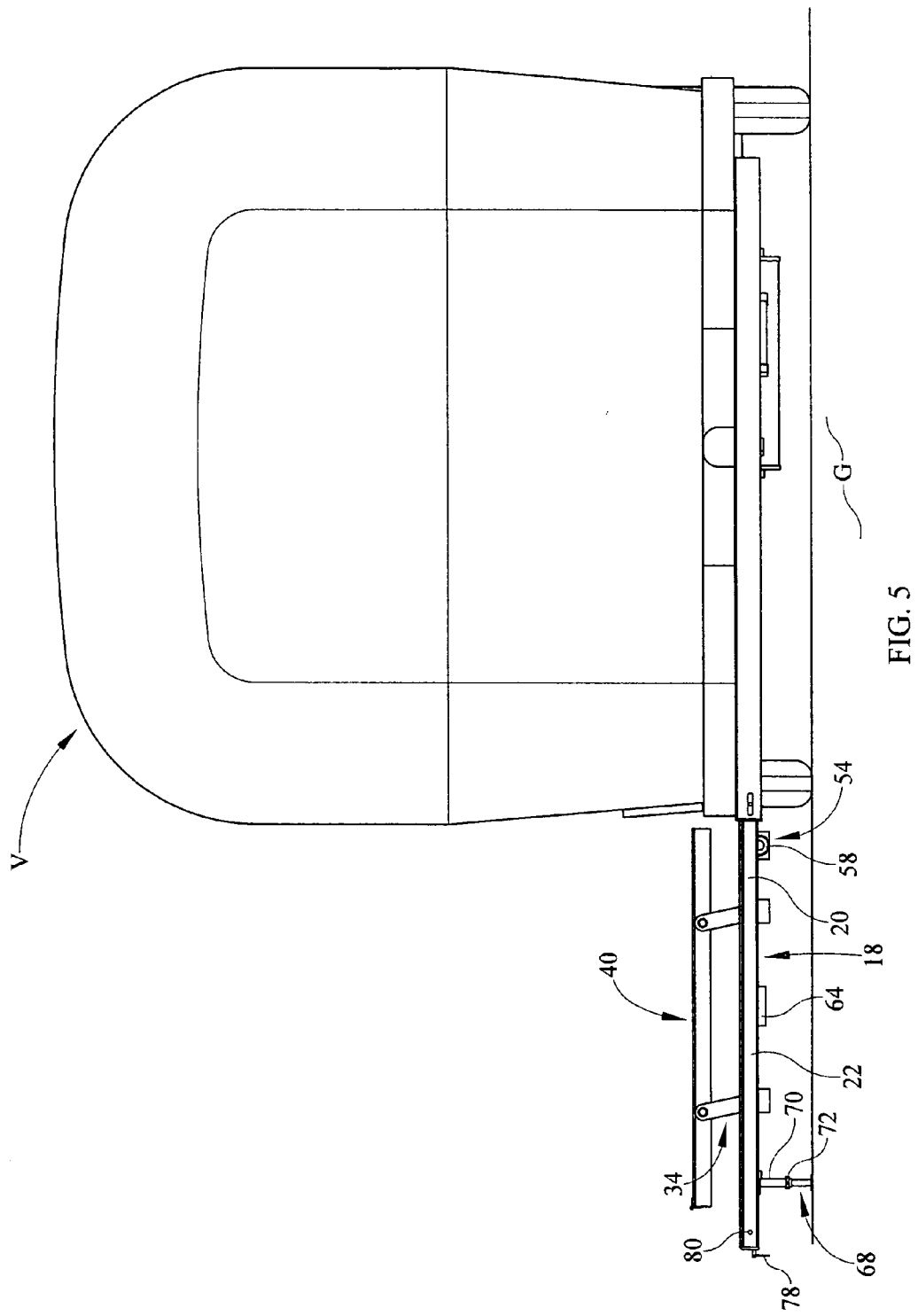
FIG. 5 is a side elevation view of the lift attachable to a vehicle in the raised position.

Referring now to the drawings, it is seen that the lift attachable to a vehicle of the present invention, generally denoted by reference numeral 10, is comprised of a pair of coextensive attachment rails 12 that are each attached to the undercarriage U of a vehicle V such as the illustrated recreational vehicle V. Attachment of each rail 12 can be in any appropriate fashion such as via the use of bolts, welding (neither illustrated), etc. Each rail 12 terminates so that it is approximately flush with the side S of the vehicle V. A series of sealed bearing rollers 14 are located on each of the rails 12 such that each roller 14 is located directly across from and faces a corresponding roller 14 on the opposite rail 12. Pins 16, which may each be spring loaded, are located on each rail 12 proximate the end of the rails 12 that is flush with the side S of the vehicle V.

A carriage 18 is provided and is slidably attached to the rails 12. The carriage, which has a generally squared U-shape, has a central hub 20 and a pair of arms 22 extending outwardly from the hub 20, the arms 22 coextensive with one another. Located along each outer side of the carriage (along the outer sides of each arm 22 and the hub 20) is a channel 24 such that the rollers 14 are received within one of the respective channels in order to allow the carriage 18 to slide with respect to the rails 12 in similar fashion to a drawer sliding within a cabinet. Appropriate stops (not illustrated) are provided in order to prevent the carriage 18 from sliding completely out from the rails 12 as is well known in the art. A release (also not illustrated) is provided in order to allow the carriage 18 to be detached from the rails 12 as needed for servicing, replacement, etc., such releases also being well known in the art.

Attached to the underside of the carriage 18 is a pair of proximal gear drive housings 26, each having a first sprocket gear 28 thereon, one proximal drive housing 26 on either side of the carriage 18 and aligned with one another. Also attached to the underside of the carriage 18 is a pair of distal gear housings 30, each having a second sprocket gear 32 thereon, one distal drive housing 30 on either side of the carriage 18 and aligned with one another and also the first gear 28 and the second gear 32 aligned with one another on each side of the carriage 18. Extension arms 34 each have a first end 36 that is rotatably attached to a respective one of the first gear housings 26 via the first gear 28 or second gear housings 30 via the second gear 32 and having an opposing second end 38 that is rotatably attached to a lift platform 40, the lift platform 40 dimensioned so as to fit relatively snugly within the area defined by the hub 20 and the arms 22. A ramp 42 is located on an end of the lift platform 40 opposite the end whereat the hub 20 is located, the ramp being pivotally attached so as to be flipped into and out of use position. A pair of hydraulic drives 44 is located on the underside of the carriage 18 such that each drive 44 has a ram 46 that extends from and retracts into the drive 44 under control of the drive 44. The drives 44 may be fluid flow connected to a pressure regulator 48, the regulator 48 being operationally attached to a hydraulic drive motor 50 which motor 50 may be located distant from the remainder of the device 10, which is especially important on low ground clearance vehicles V wherein such a motor 50 may hang too low if also attached to the undercarriage U of the vehicle V, the motor being any appropriate hydraulic motor known in the art—of course, if the pressure regulator 48 is not used, then the drives 44 are directly operationally connected to the hydraulic drive motor 50. The drives 44 are synchronized so that the ram 46 of one drive 44 is in precisely the same distance of extension from the drive 44 as the distance of extension of the other ram 46 from its drive 44. Attached to the distal end of each ram 46 is a proximal rack gear 52 such that each proximal rack gear 52 gearably meshes with a respective one of the first gears 28. An alignment assembly 54 is attached to the carriage 18 between the proximal gear housing 26 and the rams 46 such that the alignment assembly 54 has an axle 56 with a pair of alignment sprocket gears 58 on each end thereof. The proximal rack gears 52 engage with one of the alignment gears 58 in order to help maintain alignment of each rack gear 52 during operation as more fully explained below. A pair of distal rack gears 60 is provided such that each distal rack gear 60 gearably meshes with a respective one of the distal gears 32. Each distal rack gear 60 is connected with a respective one of the proximal rack gears 52 via a connection rod 62, the connection rod 62 slidably passing through a stabilizer housing 64 in order to help stabilize the drive system during operation with the distal rack gear 60 also passing through its own stabilizer housing 66. A single long rack gear may be used on each side of the carriage 10, however the use of two rack gears 52 and 60 on each side allows for better tuning of the drive system to assure a highly synchronized lifting and lowering of the lift platform 40 as more fully discussed below. Additionally, the device 10 may be set up as a master-slave system where only one side of the drive system is powered by a hydraulic drives 44, the other side simply being a slave (with no need for sprocket gears on the slave side, the extension arms 34 on that side being simply rotatably attached to the carriage 18, the attachment point, which is directly across from the master side's sprocket gear, being defined as the gear housing in such a configuration). However, the use of twin hydraulic drives 44 gives the device 10, approximately twice the lift capacity for a given specification of drive system, gives a much cleaner and smoother and highly balanced lifting and lowering of the lift platform 40, and can, if necessary, still provide operational power should one of the hydraulic drives 44 fail.

A pair of landing gear 68 is provided and each landing gear 68 is pivotally attached to one of the arms 22 of the carriage 18 proximate the distal end of the arm 22. Each landing gear 68 may have an leg 70 that is telescopic as seen and have a pin 72, which may be spring-loaded, to lock the leg 70 in the desired height in typical fashion. The landing gear 68 is pivotable between an extended position wherein the leg 70 extends downwardly from the arm 22 of the carriage 18 and a stowed position wherein the leg 70 is pivoted so as to be essentially flush against the arm 22 of the carriage 18. A pin 78, which may be spring-loaded, passes through the end of the arm 22 and through an opening 74 on a foot 76 on the end of the leg 70 in order to maintain the landing gear 68 in the stowed position.

Figure 7:
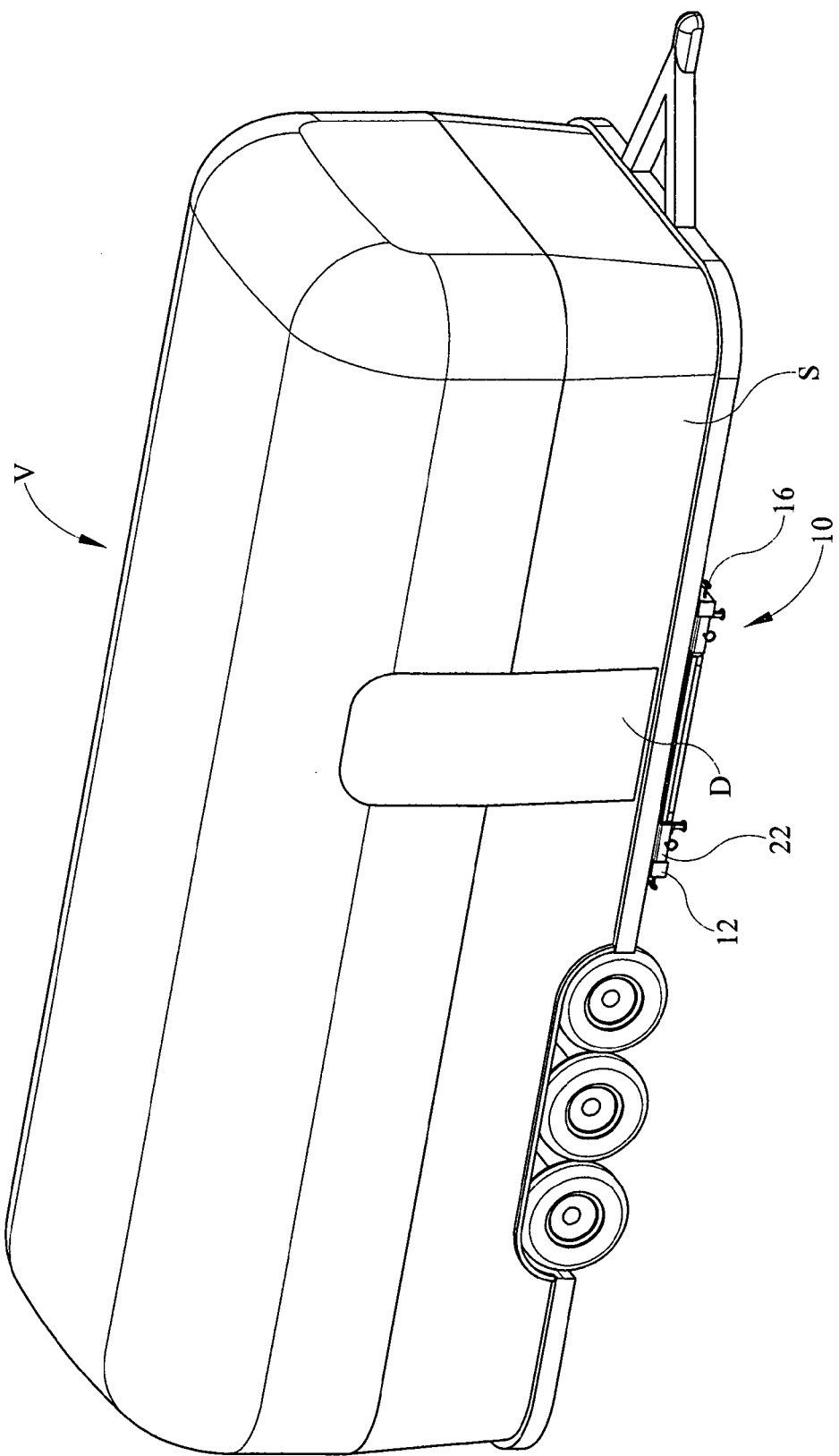
FIG. 7 is an environmental view of the lift attachable to a vehicle in a stowed position.
Figure 8:
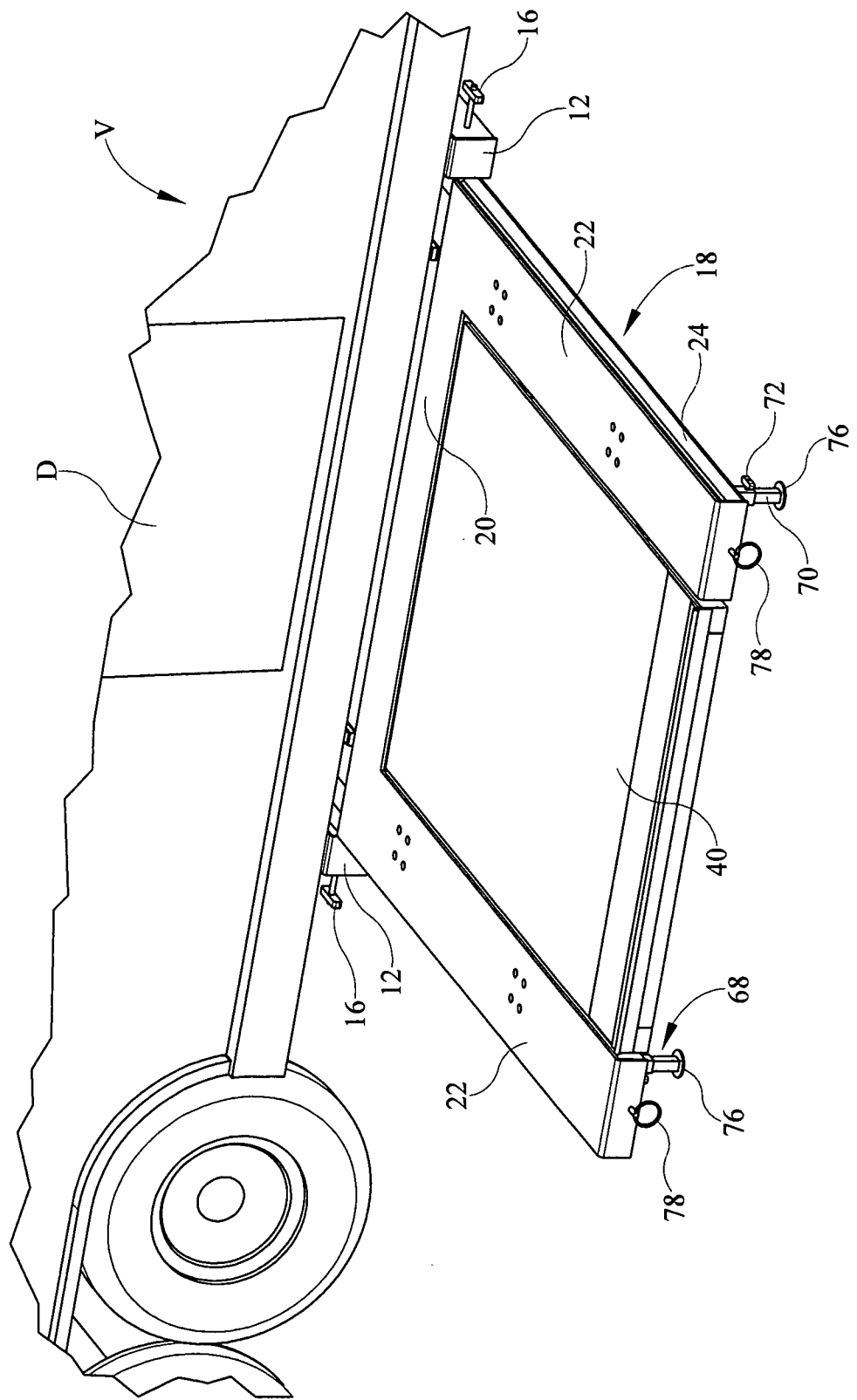
FIG. 8 is an environmental view of the lift attachable to a vehicle in a ready to be stowed position.

The rails 12 as well as the carriage 18 including the lift platform 40 and other major components are made from a strong and sturdy material such as aluminum which gives the overall device 10 substantial strength while keeping the device 10 lightweight In order to use the lift attachable to a vehicle 10 of the present invention, the rails 12 are attached to the undercarriage of the vehicle on either side of a doorway D. The carriage 18 is attached to the rails 12 in order to allow the carriage 12 to slide back and forth along the rails 12 between a stowed position (FIG. 7), wherein the carriage 18 is between the rails 12 and essentially underneath the vehicle V and an extended position (FIGS. 1-5 and 8) wherein the device 10 is ready to lift or lower a person. When the carriage 18 is in the stowed position, the pins 16 are inserted through openings 80 on the arms 22 of the carriage 18 in order to maintain the carriage 18 in the stowed position for vehicle V travel. When the carriage 18 is in the stowed position, the top of the lift platform 40 is essentially flush with the top of the carriage 18 so that each ram 46 is partially extended from its drive 44. In order to use the device 10, the carriage 18 is unpinned via the pins 16 and the carriage 18 is slid outwardly to its maximum distance of extension until the stops prevent further outward extension. Sliding of the carriage 18 is performed manually, however, if desired, a motor can be used to perform this task. At this point, the lift platform 40 is located just below the door D of the vehicle V. If needed, the lift platform 40 is raised closer toward the door D by having the drives 44, under operation of the hydraulic drive motor 50 (speed of the drives 44 being controlled via the pressure regulator 48), extend, the two rams 46 extending in lockstep. The extension of the rams 46 causes the attached proximal rack gears 52 as well as the connected distal rack gears 60 to move away from the drives 44. The extending rack gears 52 and 60, being meshed with their respective sprocket gears 28 and 32, cause their respective gears 28 and 32 to rotate which causes upward rotation of the extension arms 34, which causes the lift platform 40 to lift upwardly. All four rack gears 52 and 60 travel in unison, which causes all four sprocket gears 28 and 32 to rotate in unison, which causes all four extension arms 34 to rotate in unison which results in a smooth and even lift of the lift platform 40. Once the lift platform 40 is at the desired height, the drives 44 discontinue operation. Thereafter, in order to lower the person on the lift platform to the ground, the rams 46 on the drives 44 retract inwardly. Inward retraction of the rams 46 causes the attached proximal rack gears 52 as well as the connected distal rack gears 60 to move toward the drives 44. The refracting rack gears 52 and 60, being meshed with their respective sprocket gears 28 and 32, cause their respective gears 28 and 32 to counter-rotate which causes downward rotation of the extension arms 34, which causes the lift platform 40 to lower downwardly. All four rack gears 52 and 60 travel in unison, which causes all four sprocket gears 28 and 32 to rotate in unison, which causes all four extension arms 34 to rotate in unison which results in a smooth and even lowering of the lift platform 40. Once the lift platform 40 is at the desired height, the drives 44 discontinue operation. If the device 10 is to be maintained in this lowered position for a period of time, then the landing gears 68 are unpinned and deployed to help hold the carriage 18 on the ground G in stable fashion, however, the use of the landing gear 68 is not needed for proper operation of the device 10. The device 10 is controlled, via an appropriate switch system 82 that is operationally connected to the motor 50 for control of the motor 50 and the pressure regulator 48 for control of the regulator 48. The switch system 82, which may be mounted at a desired spot on the vehicle V or may be hand-held, or may even be a wireless remote system, can be as simple as an up switch and a down switch to control up and down movement of the lift platform 40. If a second motor is provided for sliding of the carriage 18 into and out of the stowed position, the switch system 82 can also have switches for this function. The switches may be completely manual so that depression of a particular switch causes a specific action until the switch is released. Alternately, the switches can be one touch so that once a switch is depressed, for example to raise the lift platform 40, a single depression of the particular switch will cause the lift platform 40 to lift to its maximum height. Timers and/or appropriately placed limit switches can be used for such control. Power for the various devices that need it, is provided via the vehicle's electrical system (12 volt DC) in the usual way.

Figure 6:
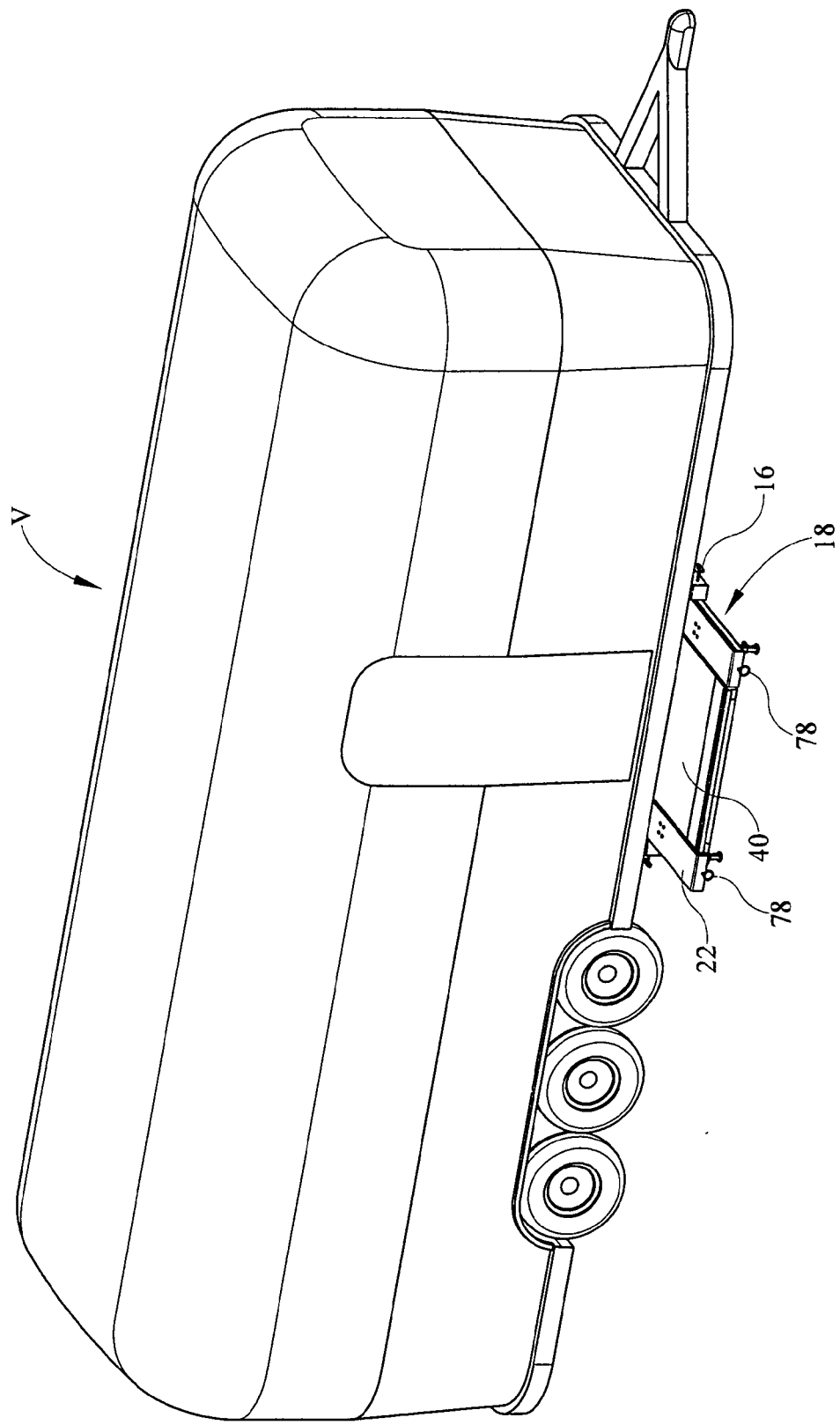
FIG. 6 is an environmental view of the lift attachable to a vehicle in a partially stowed position.

Once use of the device 10 is no longer needed, the lift platform 40 is positioned to its stow height (FIGS. 6 and 8), the landing gear 68 is raised to its stowed position, and the carriage 18 is slid back underneath the vehicle V into its stowed position. The pins 16 are inserted into their respective openings 80 in order to lock the carriage 18 in the stowed position in order to make the vehicle ready for travel.

While the invention has been particularly shown and described with reference to an embodiment thereof, it will be appreciated by those skilled in the art that various changes in form and detail may be made without departing from the spirit and scope of the invention.

I claim:

1. A lift system attachable to a vehicle, the lift system comprising:
    a carriage that is capable of sliding between a stowed position underneath the vehicle at an undercarriage thereof and a ready position extending at least partially outwardly from the undercarriage;
    a landing gear pivotally attached to an underside of the carriage such that the landing gear is pivotable between a retracted position wherein the landing gear is essentially flush against the carriage and an extended position wherein the landing gear depends downwardly from the carriage;
    a lift platform rotatably attached to the carriage such that the lift platform is capable of being articulated between a stored position wherein the lift platform is essentially flush with the carriage which allows the carriage to be able to be slid into the stowed position, a raised position wherein the lift platform is above the stored position, and a lowered position wherein the lift platform is below the stored position;
    a drive system operationally connected to the lift platform for pivoting the lift platform between the stored position, the raised position, and the lowered position, the drive system having:
    a first gear housing having a first sprocket gear rotatably located thereon and attached to the carriage proximate a first side of the lift platform;
    a second gear housing having a second sprocket gear rotatably located thereon attached to the carriage proximate an opposing second side of the lift platform;
    a third gear housing having a third sprocket gear rotatably thereon and attached to the carriage proximate the first side of the lift platform, the third sprocket gear aligned with the first sprocket gear;
    a fourth gear housing having a fourth sprocket gear rotatably thereon and attached to the carriage proximate the second side of the lift platform, the fourth sprocket gear aligned with the second sprocket gear;
    a first extension arm having a first end attached to a side of the first sprocket gear and an opposing second end rotatably attached to the first side of the lift platform;
    a second extension arm having a third end attached to a side of the second gear housing and an opposing fourth end rotatably attached to the second side of the lift platform;
    a third extension arm having a fifth end attached to a side of the third sprocket gear and an opposing sixth end rotatably attached to the first side of the lift platform;
    a fourth extension arm having a seventh end attached to a side of the fourth sprocket gear and an opposing eighth end rotatably attached to the second side of the lift platform;
    a first drive motor having a first ram, the first drive motor attached to the carriage;
    a first rack gear attached to the first ram and gearably meshed with the first sprocket gear;
    a second rack gear connected to the first rack gear via a first rod and gearably meshed with the third sprocket gear;
    a second drive motor having a second ram, the second drive motor attached to the carriage;
    a third rack gear attached to the second ram and gearably meshed with the second sprocket gear;
    a fourth rack gear connected to the third rack gear via a second rod and gearably meshed with the fourth sprocket gear;
    wherein movement of the first ram causes movement of the first rack gear which causes rotation of the meshed first sprocket gear which causes the first extension arm to rotate and causes movement of the second rack gear which causes rotation of the meshed third sprocket gear which causes the third extension arm to rotate and movement of the second ram causes movement of the third rack gear which causes rotation of the meshed third sprocket gear which causes the second extension arm to rotate and causes movement of the fourth rack gear which causes rotation of the meshed fourth sprocket gear which causes the fourth extension arm to rotate and wherein the first drive motor and the second drive motor are synchronized with one another so that the first ram is in precisely the same distance of extension from the first motor as the distance of extension of the second ram from the second motor.

2. The lift system as in claim 1 wherein the landing gear is telescoping.

3. The lift system as in claim 1 wherein the first motor and the second motor are each hydraulic.

4. The lift system as in claim 1 further comprising an alignment assembly attached carriage and engaged with the lift platform in order to maintain the lift platform in a state of alignment.

5. The lift system as in claim 4 wherein the alignment assembly comprises:
    an alignment bar having a first end and a second end, the alignment bar attached to the carriage;
    a first alignment sprocket located on the first end of the alignment bar and gearably meshed with the first rack gear between the first drive motor and the first sprocket gear; and
    a second alignment sprocket located on the second end of the alignment bar and gearably meshed with the third rack gear between the second drive motor and the second sprocket gear.

* * * * *